3,773,757
PROCESS FOR THE PREPARATION OF α-CARBOXYARYLMETHYL- AND α-CARBOARYLOXY-ARYLMETHYL PENICILLINS
Irving M. Goldman, Niantic, Daniel P. O'Shea, Groton, Richard C. Adams, Niantic, and Susumu Nakanishi, East Lyme, Conn., assignors to Pfizer Inc., New York, N.Y.
No Drawing. Filed Oct. 1, 1971, Ser. No. 185,909
Int. Cl. C07d 99/16
U.S. Cl. 260—239.1                                      7 Claims

ABSTRACT OF THE DISCLOSURE

The efficient preparation of α-carboxyarylmethyl- and α-carboaryloxyarylmethyl penicillins by acylation of aqueous solutions of 6-aminopenicillanic acid with ether solutions of arylmalonic acid-half acid chlorides and an arylmalonic acid-half ester-half acid chloride is described.

BACKGROUND OF THE INVENTION

This invention relates to processes for the preparation of acylating agents and the acylation of 6-aminopenicillanic acid to produce useful antibiotic agents.

The acylation of 6-aminopenicillanic acid with an isolated, unstable arylmalonic acid-half acid chloride is described in U.S. Pats. 3,282,926 and 3,492,291.

SUMMARY OF THE INVENTION

It has now been found that α-carboxyarylmethyl- and α-carboaryloxyarylmethyl pencillins, useful as antibiotic agents, can be readily prepared by an acylation process which comprises the steps of (a) preparing a stable acylating solution by contacting thionyl chloride in an ether solvent with an acid selected from the group consisting of phenylmalonic acid, 2-phenyl-2-(5-indanyloxycarbonyl) acetic acid and 3-thienylmalonic acid, and (b) contacting said stable acylating solution with an aqueous solution of 6-aminopenicillanic acid while maintaining the pH between about 5 to 9 to effect the acylation of said 6-aminopenicillanic acid.

It has also been found that 2-phenyl-2-(5-indanyloxycarbonyl)acetic acid can be prepared by an acylation process which comprises the steps of (a) preparing a stable acylating solution by contacting thionyl chloride in an ether solvent with phenylmalonic acid, and (b) contacting said stable acylating solution with 5-indanol to effect the acylation of said 5-indanol.

DETAILED DESCRIPTION OF THE INVENTION

The direct acylation process of this invention is far superior to the stepwise process disclosed in U.S. Pats. 3,282,926 and 3,492,291, in that it obviates the isolation of the unstable acid chlorides, thereby improving the efficiency of the acylation process. The ether solution is a stabilizing carrier for the acid chlorides, delivering them to the aqueous phase for coupling with 6-aminopenicillanic acid.

The use of an ether as a solvent permits the formation of the intermediate monoacid chlorides in nearly quantitative yield, without significant formation of diacid chlorides or disproportionation of the resulting half-acid chloride to diacid chloride and diacid. The use of an ether as a solvent allows the storage of acid chloride acylating agents for periods of several weeks under refrigeration. Additionally, the use of an ether permits the entire synthesis of the desired 6-aminopenicillanic acid derivatives to be carried out without intermediate isolation procedures.

The half acid chlorides, e.g. phenylmalonic acid-half acid chloride and 3-thienylmalonic acid-half acid chloride, are prepared by contacting the corresponding malonic acids with approximately equimolar proportions of thionyl chloride in an ether. The mixture is then maintained at a temperature of from about 20° C. to 80° C., the preferred temperature being from about 45° C. to 70° C. until reaction is substantially complete. Dimethylformamide may be used as a catalyst in amounts of from about 0.01 ml. to 5 ml./mole of acid, the preferred amount being from about 0.15 ml. of 0.25 ml./mole of acid. The reaction may be carried out without the use of dimethylformamide as a catalyst but longer reaction times are required. The reaction can be carried out effectively using total reactant concentrations from about 2% w./v. to 25% w./v. in an ether. The reaction time is dependent on the amount of dimethylformamide used, the temperature, and the concentration, and is therefore best determined by test. The phenylmalonic acid-half acid chloride and 3-thienylmalonic acid-half acid chloride so produced are prepared pure and in near quantitatively yield, as determined by direct nuclear magnetic resonance assay of the resulting solutions; the stable ether solutions can be used directly for acylation, or can be stored for periods of time, preferably under refrigeration before use. Ethers that may be used as solvents include isopropyl ether, diethyl ether, tetrahydrofuran, dioxane, etc., but isopropyl ether is preferred in that it offers substantial advantages in both convenience and effectiveness.

The acid chlorides prepared, as described, in an ether can then be used directly without isolation to acylate 6-aminopenicillanic acid in both concentrated and dilute aqueous solutions. The acid chlorides can be used advantageously in from about one to three molar proportions based on the amount of 6-aminopenicillanic acid, lesser proportions resulting in diminished yields. The ether solutions of the acid chlorides may be diluted with a water-immiscible solvent, such as hexane, thereby decreasing the loss of acid chloride by reaction with water entering the ether phase during the acylation process.

The aqueous solutions of 6-aminopenicillanic acid may be diluted prior to or during the acylation, with up to several volumes of non-reactive diluent, such as acetone, thereby leading to a decrease in the rate of penicilloic acid formation, an undesirable side-reaction always encountered in the handling of penicillins in aqueous solutions. The acylations are carried out at temperatures of about −20° C. to 30° C., the lower temperatures often affording higher yields of pure products. The acylations are carried out with maintenance of pH in about the 5 to 9 range, the optimum yields being obtained at pH in the 6 to 8 range. The pH is maintained during the acylation by addition of suitable bases such as alkali metal bicarbonates, carbonates, hydroxides, and the like.

Under the conditions of the acylation of aqueous 6-aminopenicillanic acid, the half acid chlorides in an ether are presumably extracted into the aqueous phase as the carboxylate anions, whereupon acylation occurs. In spite of the fact that the half acid chlorides are extremely reactive toward water, hydrolyzing completely in a short period of time, there is adequate selectivity in the Schotten-Baumann reaction to effect efficient acylation of the amino group of 6-aminopenicillanic acid.

As previously noted, isolation of the acid chlorides, e.g. phenylmalonic acid-half acid chloride, by removal of the ether solvent, is unnecessary and usually deleterious, owing to the instability of the half acid chloride. Phenylmalonic acid-half acid chloride, once removed from the stabilizing effect of the ether solution, disproportionates to phenylmalonic acid and the corresponding diacid chloride.

In the synthesis of the indanyl ester of α-carboxybenzylpenicillin, phenylmalonic acid-half acid chloride, formed in an ether solutions, can be converted directly without isolation to the requisite intermediate malonic acid-half indanyl ester in high yield, upon reaction with 5-indanol. This half ester can then be isolated or reacted in situ with additional thionyl chloride to form the corresponding half ester-half acid chloride, which is then coupled, with or without isolation from the ether solution, with 6-aminopenicillanic acid in aqueous or aqueous acetone solution to form the indanyl ester of α-carboxybenzylpenicillin.

This invention is further illustrated by the following examples.

Example I

Phenylmalonic acid (72.0 gm. 0.40 mole), thionyl chloride (52.4 gm., 0.44 mole) and dimethylformamide (0.070 ml.) are mixed in isopropyl ether (450 ml.) and refluxed for two hours. The resulting solution of phenylmalonic acid-half acid chloride is cooled and stored under an inert atmosphere until use.

6-aminopenicillanic acid (64.8 gm., 0.3 mole) is dissolved in water (500 ml.) by the addition of sodium hydroxide (72 ml. of 4 N) to a pH of 7.0. This and succeeding operations are performed at 0 to 5° C. The phenylmalonic acid-half acid chloride solution, prepared above, is then added over a one hour period with vigorous stirring. During this addition acetone (150 ml.) is added and the pH is maintained at 6.5 to 7.5 with sodium hydroxide (300 ml. of 4 N). After these additions are completed, the reaction mixture is allowed to stir for an additional 15 minutes at which time the pH is stabilized at pH 7.0. This solution contains disodium α-carboxybenzylpenicillin.

Example II

To a phenylmalonic acid-half acid chloride (0.40 mole) solution prepared as in Example I is added 5-indanol (53.6 gm., 0.40 mole). The mixture is refluxed for two hours, affording a near quantitative yield of 2-phenyl-2-(5-indanyloxycarbonyl)acetic acid. This product can be isolated or converted directly to the acid chloride, as follows. To the above solution of the half ester is added thionyl chloride (52.4 gm., 0.44 mole) and the mixture is heated under reflux for two hours, affording a near-quantitative yield of 2-phenyl-2-(5-indanyloxycarbonyl)-acetyl chloride. After cooling, the volume is reduced to one-half under reduced pressure.

6-aminopenicillanic acid (75.6 gm., 0.35 mole) is dissolved in water (200 ml.) by the addition of sodium hydroxide (approximately 75 ml. of 4 N) to a pH of 7.5, while maintaining the temperature at 10 to 15° C. To this solution is added 200 ml. acetone. Keeping the temperature at 10 to 15° C., the isopropylether solution of 2-phenyl - 2 - (5 - indanyloxycarbonyl)acetyl chloride, prepared above is added with stirring over 30 minutes. The pH is maintained at 6.5 by the addition of 4 N NaOH (about 160 ml.). The reaction is stirred for an additional 10 minutes after the addition. The resulting solution contains monosodium - α-(5-indanyloxycarbonyl)benzylpenicillin.

Example III 3-thienylmalonic acid (18.6 gm., 0.1 mole), thionyl chloride (13.1 gm., 0.11 mole) and dimethylformamide (0.020 ml.) are mixed in isopropyl ether (100 ml.) and refluxed for 1.5 hours. The resulting solution is cooled and stored under an inert atmosphere until use.

6-aminopenicillanic acid (16.2 gm., 0.075 mole) is dissolved in water (125 ml.) by the addition of sodium hydroxide (18 ml. of 4 N) to a pH of 7.0. This and succeeding operations are performed at 0 to 5° C. The 3-thienylmalonic acid-half acid chloride solution, prepared above, is then added over a one-half hour period with vigorous stirring. During this addition acetone (40 ml.) is added and the pH is maintained at 6.5 to 7.5 with sodium hydroxide (75 ml. of 4 N). After these additions are completed, the reaction mixture is allowed to stir for an additional 10 minutes at which time the pH is stabilized at pH 7.0. This solution contains the disodium salt of α-carboxy-3-thienylmethylpenicillanic acid.

Example IV 6-aminopenicillanic acid (43.2 gm. 0.20 M) is slurried in water (500 ml.) sodium bicarbonate is added until the pH reaches 6.3. The mixture is then cooled to 0° C. and phenylmalonic acid-half acid chloride solution prepared as in Example I is then added over a 15 min. period with vigorous stirring. During this addition the pH is maintained at pH 5.6 to 6.0 with sodium bicarbonate. After the addition of the acid chloride solution is completed the reaction mixture is allowed to stir for an additional 5 minutes at which time the pH is stabilized at pH 6.2. The solution contains disodium α-carboxybenzylpenicillin.

Example V

Phenylmalonic acid (3.60 gm., 0.02 M) thionyl chloride (1.45 ml., 0.02 M) and dimethylformamide (0.10 ml.) are mixed in 20 ml. dioxane and refluxed one hour. The resulting solution is cooled and stored under an inert atmosphere until use.

6-aminopenicillanic acid (2.16 gm. 0.01 M) is dissolved in water (50 ml.) by the addition of sodium bicarbonate to a pH of 6.5. This and succeeding operations are performed at 0 to 5° C. The phenylmalonic acid-half acid chloride solution, prepared above, is then added over a 5 minute period with vigorous stirring. During this addition the pH is maintained at 6.5 to 7.5 with sodium bicarbonate. After these additions are completed, the reaction mixture is allowed to stir at 5° C. for 10 minutes at which time the pH is stabilized at 7.0. This solution contains disodium α-carboxybenzylpenicillin.

Example VI

Phenylmalonic acid (3.60 gm., 0.02 M), thionyl chloride (1.45 ml., 0.02 M), and dimethylformamide (0.10 ml.) are mixed in 20 ml. tetrahydrofuran and refluxed 2½ hours. The resulting solution is cooled and stored under an inert atmosphere until use.

6-aminopenicillanic acid (2.16 gm., 0.01 M) is dissolved in water (50 ml.) by the addition of sodium bicarbonate to a pH of 6.5. This and succeeding operations are performed at 0 to 5° C. The phenylmalonic acid-half acid chloride solution prepared above is then added over a 5 minute period with vigorous stirring. During this addition the pH is maintained at 6.5–7.5 with sodium bicarbonate. After these additions are completed, the reaction mixture is allowed to stir at 5° C. for 10 minutes at which time the pH is stabilized at 7.0. This solution contains disodium α-carboxybenzylpenicillin.

Example VII

Phenylmalonic acid (3.60 gms., 0.02 M), thionyl chloride (1.45 ml., 0.02 M) and dimethylformamide (0.10 ml.) are mixed in 20 ml. diethyl ether and refluxed 20 hours. The resulting solution is cooled and stored under an inert atmosphere until use.

6-aminopenicillanic acid (2.16 g., 0.01 M) is dissolved in water (50 ml.) by the addition of sodium bicarbonate to a pH of 6.5. This and succeeding operations are performed at 0 to 5° C. The phenylmalonic acid-half acid chloride solution prepared above is then added over a 5 minute period with vigorous stirring. During this addition the pH is maintained at 6.5 to 7.5 with sodium bicarbonate. After these additions are completed, the reaction mixture is allowed to stir at 5° C. for 10 minutes at which time the pH is stabilized at 7.0. This solution contains disodium α-carboxybenzylpenicillin.

Example VIII

Phenylmalonic acid (3.60 gm., 0.02 M), thionyl chloride (1.45 ml., 0.02 M), and dimethylformamide (0.10 ml.) are mixed in 20 ml. dimethoxyethane and refluxed 1 hour. The resulting solution is cooled and stored under an inert atmosphere until use.

6-aminopenicillanic acid (2.16 g., 0.01 M) is dissolved in water (50 ml.) by the addition of sodium bicarbonate to a pH of 6.5. This and succeeding operations are performed at 0 to 5° C. The phenylmalonic acid-half acid chloride solution prepared above is then added over a 5 minute period with vigorous stirring. During this addition the pH is maintained at 6.5 to 7.5 with sodium bicarbonate. After these additions are completed, the reaction mixture is allowed to stir at 5° C. for 10 minutes at which time the pH is stabilized at 7.0. This solution contains disodium α-carboxybenzylpenicillin.

What is claimed is:

1. An acylation process which comprises the steps of (a) preparing a stable acylating solution by contacting thionyl chloride in an ether solvent with an acid selected from the group consisting of phenylmalonic acid, 2-phenyl-2-(5-indanyloxycarbonyl)acetic acid and 3-thienylmalonic acid, and (b) contacting said stable acylating solution with an aqueous solution of 6-aminopenicillanic acid while maintaining the pH between about 5 to 9 to effect the acylation of said 6-aminopenicillanic acid.

2. The process of claim 1 wherein said aqueous solution contains acetone.

3. The process of claim 1 wherein said acid is phenylmalonic acid.

4. The process of claim 1 wherein said acid is 2-phenyl-2-(5-indanyloxycarbonyl)acetic acid.

5. The process of claim 1 wherein said acid is 3-thienylmalonic acid.

6. The process of claim 1 wherein said ether solvent is isopropyl ether.

7. An acylation process which comprises the steps of (a) preparing a stable acylating solution by contacting thionyl chloride in an ether solvent with phenylmalonic acid, and (b) contacting said stable acylating solution with 5-indanol to effect the acylation of said 5-indanol.

References Cited

UNITED STATES PATENTS 3,492,291   1/1970   Brain et al. _____ 260—239.1

NICHOLAS S. RIZZO, Primary Examiner

U.S. Cl. X.R.

424—271